United States Patent [19]
Britz et al.

[11] 3,912,541
[45] Oct. 14, 1975

[54] RAPID ACTIVATION AND CHECKOUT DEVICE FOR BATTERIES

[75] Inventors: William J. Britz, Huntsville; William A. Boshers, Madison, both of Ala.

[73] Assignee: The United States of America as represented by the United States Aeronautics and Space Administration Office of General Counsel-Code GP, Washington, D.C.

[22] Filed: June 27, 1974

[21] Appl. No.: 483,857

[52] U.S. Cl. ................. 136/90; 136/114; 136/162; 136/182
[51] Int. Cl.².......................................... H01M 6/30
[58] Field of Search ............ 136/90, 114, 162, 181, 136/182

[56] References Cited
UNITED STATES PATENTS

| | | |
|---|---|---|
| 2,713,080 | 7/1955 | Barrett................................ 136/162 |
| 3,018,314 | 1/1962 | Cooper et al......................... 136/9C |
| 3,202,548 | 8/1965 | Adlhart et al........................ 136/9C |
| 3,483,041 | 12/1969 | Kalen.................................. 136/162 |
| 3,818,325 | 6/1974 | Boshers............................... 136/182 |

*Primary Examiner*—Maynard R. Wilbur
*Assistant Examiner*—Richard E. Berger
*Attorney, Agent, or Firm*—Wayland H. Riggins; L. D. Wofford, Jr.; John R. Manning

[57] ABSTRACT

An apparatus for activating a battery by inserting an electrolyte into the cells thereof while concurrently making voltage measurements on each cell. The battery has a planar top with vertically extending passages extending therethrough providing access to the cells. It also has test points adjacent each cell. A housing is mounted on top of the battery for supplying an electrolyte through sealed passages into the cells while simultaneously checking the voltage of the cells. The electrolyte is forced by pressure into the battery.

6 Claims, 6 Drawing Figures

RAPID ACTIVATION AND CHECKOUT DEVICE FOR BATTERIES

ORIGIN OF THE INVENTION

The invention described herein was made by employees of the United States Government, and may be manufactured and used by or for the Government for governmental purposes without the payment of any royalties thereon or therefor.

BACKGROUND OF THE INVENTION

This invention relates to a device for activating batteries, and more particularly to a device for inserting an electrolyte into the cells of a battery while simultaneously electrically checking the cells.

Heretofore, generally the method for activating batteries either required cell-by-cell activation by means of inserting an electrolyte into each cell with a syringe or placing the battery on an activation rack. After the battery had been activated it was then necessary to provide an electrical check of each of the individual cells. Such required a considerable amount of time.

In order to simultaneously electrically check all of the cells of the battery, a device was developed such as disclosed in co-pending NASA application, Ser. No. 326,327, now U.S. Pat. No. 3,818,325, filed in name of William A. Boshers. This device includes a plate provided with a plurality of electrical probes that can simultaneously test all of the cells of a multi-cell battery. A voltmeter is coupled by electrical connectors to each of the cells for producing an electrical measurement thereof. While such a device operated satisfactorily for electrically determining the activation of each of the cells, there still remained the time consuming problem of inserting the electrolyte into each of the cells.

SUMMARY OF THE INVENTION

The instant invention which relates to a battery activation and testing device provides a means for simultaneously activating all of the cells of a battery with an electrolyte while measuring the voltage buildup therein. The device is designed to operate on a battery which has a plurality of cells, each of which has a vertically extending passage extending through the top thereof for providing access to the individual cells. Electrically conductive test points are provided at the top of the battery for each of the cells. The device includes an enclosed housing containing the electrolyte which is to be inserted into the cells. The electrolyte may be any suitable conventional electrolyte. The housing has a planar bottom with a plurality of tubular members carried therein for conveying the electrolyte from the housing to the cells. The bottom of the housing also has a plurality of downwardly extending electrical test probes mounted therein which are adapted to be inserted within the recess carrying the test points in the battery. A sealed coupling is provided between the passages through which the electrolyte passes so as to produced a hermetically sealed passage therethrough.

A top is provided on the housing and has a line from a vacuum pump extending therethrough so that when the housing is mounted on top of the battery the vacuum pump can be used to draw all of the air from the cells of the battery and the housing. After the air has been evacuated from the housing, another valve is opened which exposes the interior of the housing to atmospheric pressure. This atmospheric pressure bearing down on top of the electrolyte forces the electrolyte into the cells of the battery.

Concurrently with the forcing of the electrolyte into the cells of the battery for activating the cells, electrical readings are taken from the test point and supplied to conventional instruments, such as voltmeters for indicating the condition thereof.

Accordingly, it is a general object of the present invention to provide an apparatus for concurrently activating the cells of a battery while electrically testing the cells.

A more specific object of the present invention is to provide an apparatus which simultaneously supplies an electrolyte to the cells of a multi-cell battery.

Another important object of the present invention is to provide an apparatus for rapidly supplying a measured amount of electrolyte to a plurality of cells of a multi-cell battery.

These and other objects and advantages of the invention will become apparent upon reference to the specification, attendant claims and drawings.

DESCRIPTION OF THE PREFERRED EMBODIMENT

Figure 1:
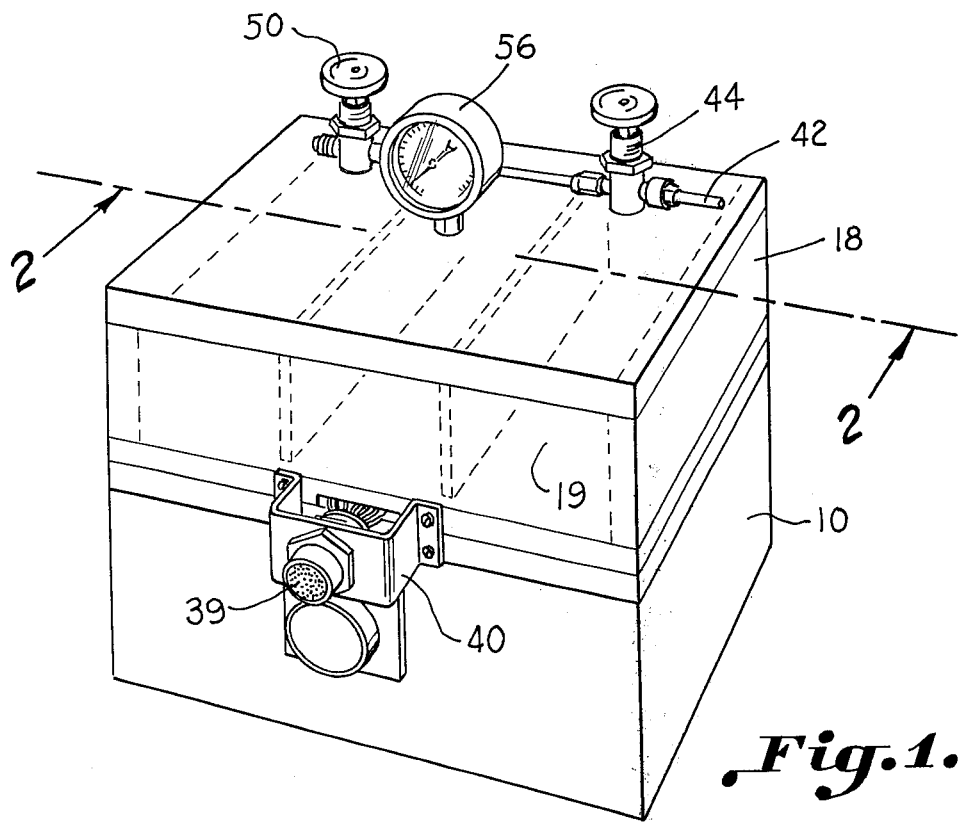
FIG. 1 is a perspective view of apparatus constructed in accordance with the present invention provided for activating and checking the cells of a battery.

Referring in more detail to FIG. 1 of the drawings, there is illustrated generally by the reference character 10, a conventional multi-cell battery. The battery 10 is the type of battery that may be used in the space shuttle program, for example. It is anticipated that a large number of these batteries will be utilized in a space shuttle and prior to relaunching the shuttle, it would be necessary to re-activate each of these batteries. Such, of course, would be very time consuming if the task of activating each of the cells were undertaken on an individual basis.

Figure 2:
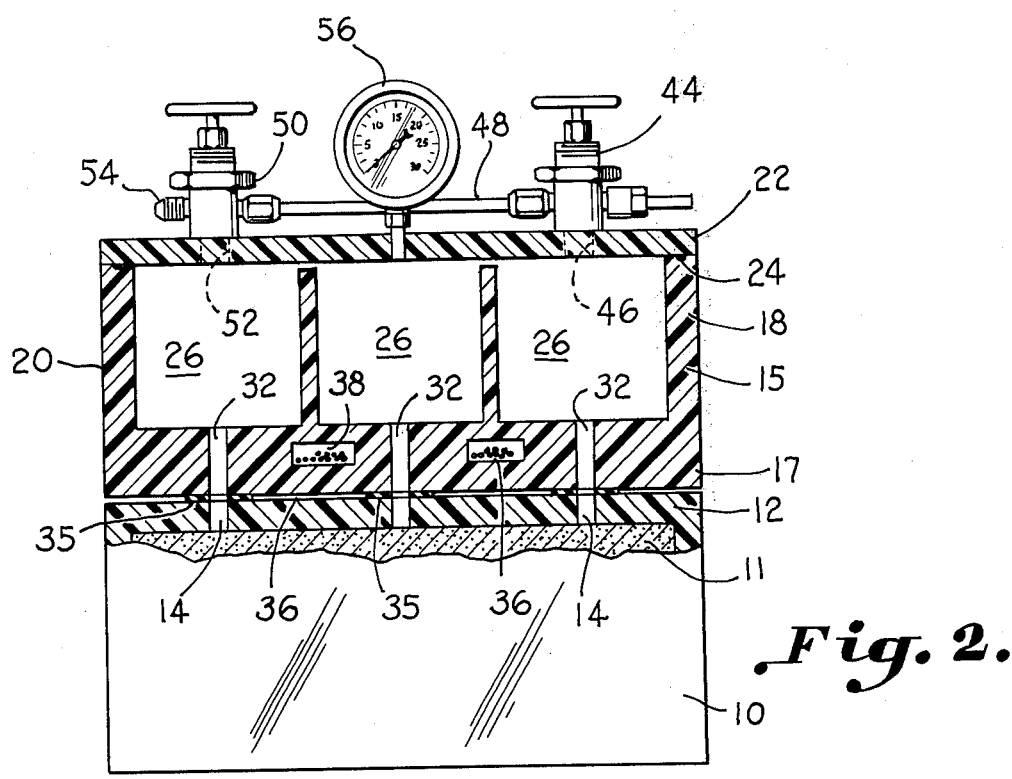
FIG. 2 is a sectional view taken along the line 2—2 of FIG. 1.
Figure 3:
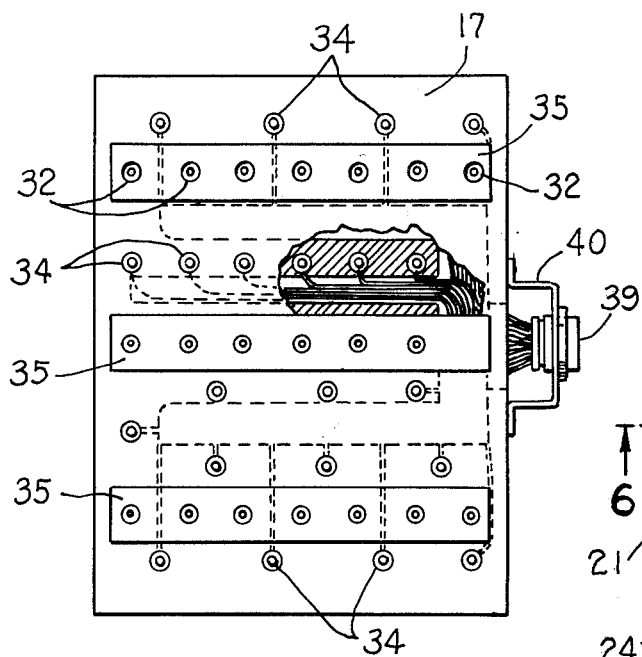
FIG. 3 is a bottom plan view of the apparatus that is to be mounted on top of the battery.
Figure 4:
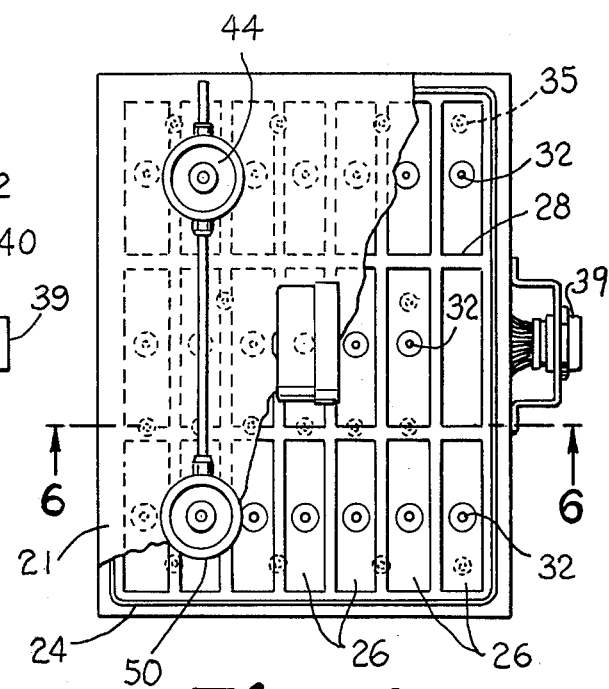
FIG. 4 is a top, plan view of the device illustrated in FIG. 1, with parts removed for purposes of clarity.
Figure 5:
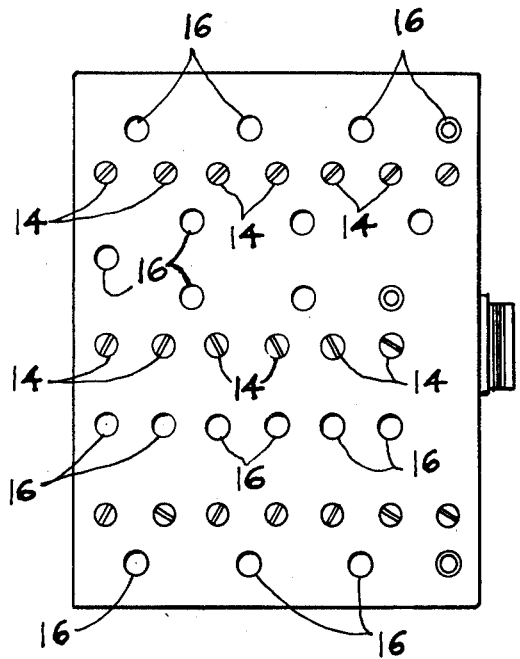
FIG. 5 is a top plan view illustrating the cells and test points of a battery that is to be activated.
Figure 6:
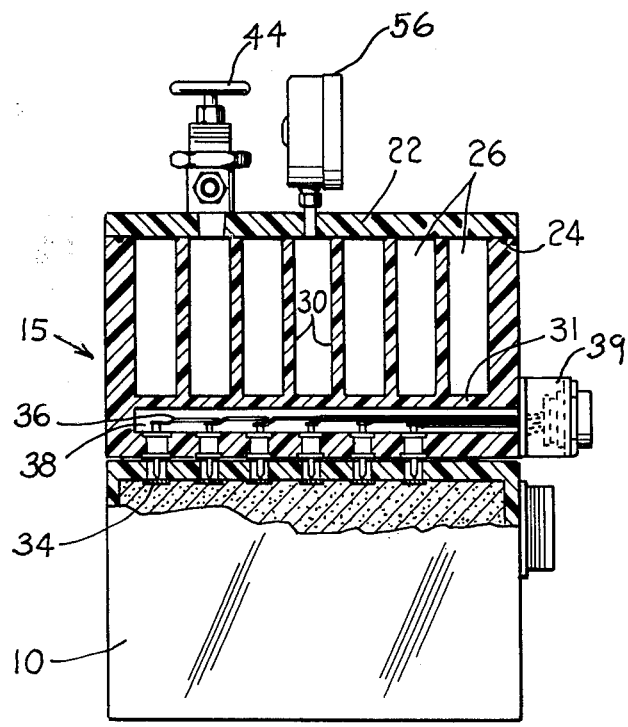
FIG. 6 is a sectional view taken along the line 6—6 of FIG. 4.

In order to speed up the process of activating and testing each of the cells, a housing, such as illustrated in FIG. 1 was designed to fit on top of a planar top 12 of the battery. The top 12 of the battery is shown in FIGS. 2 and 5 and has a plurality of vertically extending passages 14 which extend into cells 11 of the battery 10. Electrically conductive test points 16 are coupled to each of the individual cells 11 so that if a voltage reading were taken at a test point 16, such would indicate the charge of the particular cell associated therewith. Positioned on the planar top of the battery 10 is a housing 15 consisting of a bottom 17, side walls 18, 19, 20 and 21 which have positioned thereon a top 22. It is noted that an "o" ring 24 is carried in the top 22 to provide an hermetically sealed relationship between the top 22 and the side vertical walls.

The interior of the housing 15 is partitioned off into a plurality of rectangular compartments 26 by the vertically extending horizontal walls 28 and the vertically extending longitudinal walls 30. The compartments 26 are open adjacent the top and such are closed by the top 22 provided thereon. The compartments 26 have a bottom 31 through which tubular passages 32 extend providing access through the bottom of the housing 15. These tubular passages 32 are designed to be in alignment with the passages 14 of the battery to be activated.

It is noted in FIG. 2 that a resilient strip 35 is provided between the bottom wall 17 of the housing and the top 12 of the battery encompassing the tubular passages 32 so as to produce a sealed coupling between the passages 32 and 14 of the housing and battery. When the compartments 26 are filled with an electrolyte, such flows through the tubular passages into the cells of the battery for rejuvenating the cells.

Positioned directly below the bottom 31 of the compartments is a space for accommodating a plurality of electrical probes 34. These probes are mounted in the bottom wall 17 of the housing and are positioned in such a configuration so as to mate with the test points 16 provided adjacent each cell 11 of the battery 10. Electrical wires 36 extend from respective probes and are fed through passages 38 provided in the bottom wall 17 to an external socket 39. The external socket 39 is mounted in a bracket 40 carried on the side of the housing 15. The probe may take the form of the probes disclosed in co-pending application, Ser. No. 326,327 filed in the name of William A. Boshers and assigned to the National Aeronautical and Space Administration. The probes 34 are normally spring-biased so as to form a good, firm electrical contact with the test point 16 of the batteries.

In order to force the electrolyte which is deposited within the receptacles 26 of the housing 15 through the passages 32 into the cells of the battery, first a vacuum is applied to the housing by connecting a vacuum pump to a conduit 42 which is connected through a valve 44 to a passage 46 shown in dotted line communicating with the interior of the housing 15. Positioned on the other side of the valve 44 is another conduit 48 that has its opposite end coupled to another on-off valve 50. The on-off valve 50 also has a passage 52 shown in dotted lines coupled to the interior of the housing 15. The on-off valve 50 has an external port 54 exposed to the atmosphere. In order to determine the pressure within the housing 15, a pressure gauge 56 is mounted on top of the housing 15 and communicates with the interior thereof.

When it is desired to rejuvenate the battery, first the top 22 of the housing is removed and an electrolyte is deposited within the compartments 26. The top 22 is replaced on the housing and a vacuum pump is coupled to the conduit 42. Valve 44 is opened and valve 50 is closed. The vacuum pump reduces the pressure within the housing 15 and withdraws the air from the cells of the battery. The resilient strips 35 provide an air tight seal between the cells of the battery and the housing. In some instances, it is desirable to place latches between the housing 15 and the battery 10 so as to draw such tightly together.

After the pressure in the housing 15 has been reduced, the vacuum pump is cut off and the valve 50 is opened. When the valve 50 is opened, air is allowed to flow into the housing 15 forcing the electrolyte down through the passages 32 and 14 into the cells of the battery. While the electrolyte is being forced into the cells of the battery, electrical voltage readings are taken by connecting volt meters to the socket 39. Instantaneous electrical readings of the cells of the battery 10 can be made since the probes 34 are coupled to the test points 16 of the respective cells 11 of the battery 10.

While a preferred embodiment of the invention has been described using specific terms, such description is for illustrative purposes only, and it is to be understood that changes and variations may be made without departing from the spirit or scope of the following claims.

What is claimed is:

1. An apparatus for activating a battery by inserting an electrolyte into the cells thereof while concurrently making voltage measurements on each cell, said battery having a planar top with vertically extending passages extending therethrough providing access to cells of said battery, electrically conductive test points provided on said battery for each of said cells, said apparatus comprising:
   a. an enclosed housing containing said electrolyte which is to be inserted into said cells for activating said cells;
   b. said enclosed housing having a planar bottom so that said housing can be positioned on said planar top of said battery;
   c. tubular members carried in said bottom of said housing for conveying said electrolyte from said housing to said cells of said battery;
   d. means for providing a sealed coupling between said tubular members and passages when said housing is positioned on said battery;
   e. a plurality of downwardly extending electrical test probes carried by said bottom of said housing for engaging said test points on said battery; and
   f. electrical connector means coupled to said electrical test probes for conveying voltage signals from said test probes external of said housing;
   whereby concurrently with said electrolyte being supplied to said cells from said housing electrical voltage measurements can be made of each cell.

2. The apparatus as set forth in claim 1 further comprising:
   a. an hermetically sealed top carried on said housing;
   b. a vacuum pump connected to said housing for evacuating air from said cells and said housing; and
   c. valve means for selectively exposing an upper portion of said housing to atmospheric pressure, for forcing said electrolyte into said cells.

3. The apparatus as set forth in claim 1 wherein:
   a. a plurality of compartments are carried in said housing;
   b. each of said tubular members communicating with a respective compartment; and
   c. said electrolyte being carried in said compartments for insertion into said cells of said battery.

4. The apparatus as set forth in claim 1 wherein:
   a. said means for providing a sealed coupling between said tubular members and passages is a resilient strip which extends around said tubular members.

5. The apparatus as set forth in claim 1 wherein:
   a. said tubular members are arranged in the bottom of said housing in the same configuration as said passages to said cells of said battery so that when said housing is placed on top of said battery communication is provided between respective passages and tubular members.

6. The apparatus as set forth in claim 2 further comprising:

a. a vacuum gauge carried by said housing and operably connected to the exterior thereof for indicating the pressure within said housing.

* * * * *